(12) United States Patent
Sharma et al.

(10) Patent No.: US 11,475,307 B2
(45) Date of Patent: Oct. 18, 2022

(54) SYSTEMS AND METHODS FOR AUTOMATING INFORMATION EXTRACTION FROM PIPING AND INSTRUMENTATION DIAGRAMS

(71) Applicant: Tata Consultancy Services Limited, Mumbai (IN)

(72) Inventors: Monika Sharma, Gurgaon (IN); Rohit Rahul, Gurgaon (IN); Lovekesh Vig, Gurgaon (IN); Shubham Paliwal, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 797 days.

(21) Appl. No.: 16/381,316

(22) Filed: Apr. 11, 2019

(65) Prior Publication Data
US 2020/0175372 A1    Jun. 4, 2020

(30) Foreign Application Priority Data
Nov. 30, 2018 (IN) .............................. 201821045399

(51) Int. Cl.
*G06N 3/08* (2006.01)
*G06F 16/9035* (2019.01)
(Continued)

(52) U.S. Cl.
CPC ......... *G06N 3/082* (2013.01); *G06F 16/9027* (2019.01); *G06F 16/9035* (2019.01); *G06N 3/0418* (2013.01)

(58) Field of Classification Search
CPC .. G06N 3/082; G06N 3/0418; G06F 16/9035; G06F 16/9027
See application file for complete search history.

(56) References Cited

U.S. PATENT DOCUMENTS

| 2015/0220076 A1* | 8/2015 | Uchida | G05B 19/05 700/97 |
| 2016/0161930 A1 | 6/2016 | Jirkovsky et al. | |

(Continued)

FOREIGN PATENT DOCUMENTS

KR    101204087    11/2012

OTHER PUBLICATIONS

Tian, Zhi, et al. "Detecting text in natural image with connectionist text proposal network." European conference on computer vision. Springer, Cham, 2016. (Year: 2016).*

(Continued)

*Primary Examiner* — Eric Nilsson
(74) *Attorney, Agent, or Firm* — Finnegan, Henderson, Farabow, Garrett & Dunner, LLP

(57) ABSTRACT

Systems and methods for automating information extraction from piping and instrumentation diagrams is provided. Traditional systems and methods do not provide for end-to-end and automated data extraction from the piping and instrumentation diagrams. The method disclosed provides for automatic generation of end-to-end information from piping and instrumentation diagrams by detecting, via one or more hardware processors, a plurality of components from one or more piping and instrumentation diagrams by implementing one or more image processing and deep learning techniques; associating, via an association module, each of the detected plurality of components by implementing a Euclidean Distance technique; and generating, based upon each of the associated plurality of components, a plurality of tree-shaped data structures by implementing a structuring technique, wherein each of the plurality of tree-shaped data structures capture a process flow of pipeline schematics corresponding to the one or more piping and instrumentation diagrams.

15 Claims, 21 Drawing Sheets

(51) Int. Cl.
   *G06F 16/901*    (2019.01)
   *G06N 3/04*      (2006.01)

(56) References Cited

U.S. PATENT DOCUMENTS

2019/0005324 A1*  1/2019  Anisimovskiy .......... G06N 3/08
2019/0236352 A1*  8/2019  Duke ................... G06V 30/413
2020/0272911 A1*  8/2020  Quiros Araya ........ G06N 5/025

OTHER PUBLICATIONS

Tan, Wei Chian, I-Ming Chen, and Hoon Kiang Tan. "Automated identification of components in raster piping and instrumentation diagram with minimal pre-processing." 2016 IEEE International Conference on Automation Science and Engineering (CASE). IEEE, 2016. (Year: 2016).*

Long, Jonathan, Evan Shelhamer, and Trevor Darrell. "Fully convolutional networks for semantic segmentation." Proceedings of the IEEE conference on computer vision and pattern recognition. 2015. (Year: 2015).*

* cited by examiner

SYSTEMS AND METHODS FOR AUTOMATING INFORMATION EXTRACTION FROM PIPING AND INSTRUMENTATION DIAGRAMS

PRIORITY CLAIM

This U.S. patent application claims priority under 35 U.S.C. § 119 to: India Application No. 201821045399, filed on Nov. 30, 2018. The entire contents of the aforementioned application are incorporated herein by reference.

TECHNICAL FIELD

The disclosure herein generally relates to engineering schematics, and, more particularly, to systems and methods for automating information extraction from piping and instrumentation diagrams.

BACKGROUND

Piping and Instrumentation diagrams comprise one of the most common modes of representing engineering schematics. Such diagrams describe a layout of an engineering process flow along with the interconnected process equipment. Over the years, the piping and instrumentation diagrams have been manually generated, scanned and stored as image files. These files need to be digitized for purposes of inventory management and updates, and easy reference to different components of the schematics. There are several challenging vision problems associated with digitizing real world piping and instrumentation diagrams. For example, real world piping and instrumentation diagrams come in several different resolutions, and often contain noisy textual information. Extraction of instrumentation information from these diagrams involves accurate detection of symbols that frequently have minute visual differences between them. Identification of pipelines that may converge and diverge at different points in the image is a further cause for concern.

The piping and instrumentation diagrams are able to represent complex engineering workflows depicting schematics of a process flow through pipelines, vessels, actuators and control valves. A generic representation includes fluid input points, paths as pipelines, symbols which represent control and measurement instruments and, sink points. Most industries maintain these complex piping and instrumentation diagrams in the form of hard-copies or scanned images and do not have any automated mechanism for information extraction and analysis of the piping and instrumentation. Consequently, future analysis and audit for process improvement involves manual involvement which is expensive given the domain expertise required. The traditional systems and methods implementing manual techniques thus fail to digitize and extract end-to-end information from the piping and instrumentation diagrams.

SUMMARY

Embodiments of the present disclosure present technological improvements as solutions to one or more of the above-mentioned technical problems recognized by the inventors in conventional systems. For example, in one embodiment, a method for automating information extraction from piping and instrumentation diagrams, the method comprising: detecting, via one or more hardware processors, a plurality of components from one or more piping and instrumentation diagrams by implementing one or more image processing and deep learning techniques, wherein the plurality of components comprise at least one of a pipeline, a pipeline code, an inlet and an outlet, a symbol and a text; associating, via an association module, each of the detected plurality of components by implementing a Euclidean Distance technique, wherein the associating comprises mapping each of the detected plurality of components with at least one of an appropriate pipeline; generating, based upon each of the associated plurality of components, a plurality of tree-shaped data structures by implementing a structuring technique,
wherein each of the plurality of tree-shaped data structures capture a process flow of pipeline schematics corresponding to the one or more piping and instrumentation diagrams; filtering, from the one or more piping and instrumentation diagrams, one or more pipeline codes comprising a plurality of false positive pipeline codes, by implementing a Connectionist Text Proposal Network (CTPN) technique; extracting, by implementing a Fully Convolutional Neural Network (FCN) technique, a set of contextual information from the symbol and learning a spatial location of one or more objects in the symbol; pruning, via a filtering technique, each of the plurality of tree-shaped data structures, for filtering a set of false positive pipelines from the one or more piping and instrumentation diagrams; removing, via the filtering technique, one or more pipelines from the one or more piping and instrumentation diagrams, and wherein the one or more pipelines are represented in each of the plurality of tree-shaped data structure as a leaf node; and traversing each of the plurality of tree-shaped data structures starting from a root node and removing all nodes that do not lead to any inlet.

In another aspect, there is provided a system for automating information extraction from piping and instrumentation diagrams, the system comprising a memory storing instructions; one or more communication interfaces; and one or more hardware processors coupled to the memory via the one or more communication interfaces, wherein the one or more hardware processors are configured by the instructions to: detect a plurality of components from one or more piping and instrumentation diagrams by implementing one or more image processing and deep learning techniques, wherein the plurality of components comprise at least one of a pipeline, a pipeline code, an inlet and an outlet, a symbol and a text; associating, via an association module, each of the detected plurality of components by implementing a Euclidean Distance technique, wherein the associating comprises mapping each of the detected plurality of components with at least one of an appropriate pipeline; generate, based upon each of the associated plurality of components, a plurality of tree-shaped data structures by implementing a structuring technique, wherein each of the plurality of tree-shaped data structures capture a process flow of pipeline schematics corresponding to the one or more piping and instrumentation diagrams; detect the pipeline code by filtering, from the one or more piping and instrumentation diagrams, one or more pipeline codes comprising a plurality of false positive pipeline codes, by implementing a Connectionist Text Proposal Network (CTPN) technique; extracting a set of contextual information from the symbol and learning a spatial location of one or more objects in the symbol by implementing a Fully Convolutional Neural Network (FCN) technique; capture the process flow of pipeline schematics is by pruning, via a filtering technique, each of the plurality of tree-shaped data structures, for filtering a set of false positive pipelines from the one or more piping and instrumentation diagrams; remove, by implementing the filtering technique, one or more pipelines from the one or more piping and instrumentation diagrams, wherein the one or more pipelines are represented in each of the plurality of tree-shaped data structure as a leaf node; and traverse each of the plurality of tree-shaped data structures starting from a root node and removing all nodes that do not lead to any inlet.

In yet another aspect, there is provided one or more non-transitory machine readable information storage mediums comprising one or more instructions which when executed by one or more hardware processors causes the one or more hardware processors to perform a method for automating information extraction from piping and instrumentation diagrams, the method comprising: detecting a plurality of components from one or more piping and instrumentation diagrams by implementing one or more image processing and deep learning techniques, wherein the plurality of components comprise at least one of a pipeline, a pipeline code, an inlet and an outlet, a symbol and a text; associating, via an association module, each of the detected plurality of components by implementing a Euclidean Distance technique, wherein the associating comprises mapping each of the detected plurality of components with at least one of an appropriate pipeline; generating, based upon each of the associated plurality of components, a plurality of tree-shaped data structures by implementing a structuring technique, wherein each of the plurality of tree-shaped data structures capture a process flow of pipeline schematics corresponding to the one or more piping and instrumentation diagrams; filtering, from the one or more piping and instrumentation diagrams, one or more pipeline codes comprising a plurality of false positive pipeline codes, by implementing a Connectionist Text Proposal Network (CTPN) technique; extracting, by implementing a Fully Convolutional Neural Network (FCN) technique, a set of contextual information from the symbol and learning a spatial location of one or more objects in the symbol; pruning, via a filtering technique, each of the plurality of tree-shaped data structures, for filtering a set of false positive pipelines from the one or more piping and instrumentation diagrams; removing, via the filtering technique, one or more pipelines from the one or more piping and instrumentation diagrams, and wherein the one or more pipelines are represented in each of the plurality of tree-shaped data structure as a leaf node; and traversing each of the plurality of tree-shaped data structures starting from a root node and removing all nodes that do not lead to any inlet.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
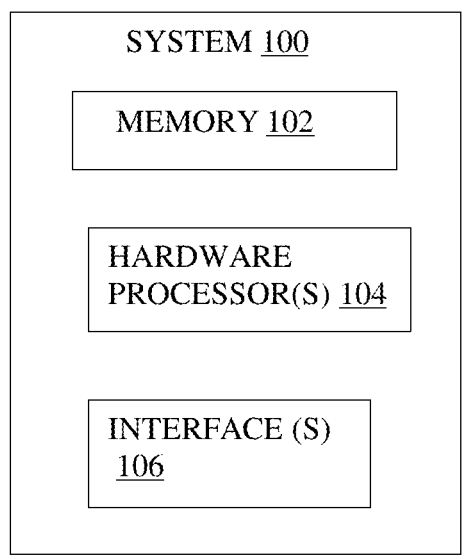
FIG. 1 illustrates a block diagram of a system for automating information extraction from piping and instrumentation diagrams, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Embodiments of the present disclosure provide systems and methods for automating information extraction from piping and instrumentation diagrams. The digitization process of the piping and instrumentation diagrams comprises an identification and localization of pipeline codes, pipelines, inlets, outlets and symbols which is followed by mapping of individual components with the pipelines. The piping and instrumentation diagrams represent complex engineering workflows depicting schematics of a process flow through pipelines, vessels, actuators and control valves.

Some of the traditional systems and techniques cite digitization of complex engineering documents comprising of both textual and graphical elements, for example, complex receipts, inspection sheets, and engineering diagrams. For example, one of the traditional techniques cite automating of the assessment of Auto-Computer-Aided-Designing (CAD) Drawing Exchange Format (DXF) by converting a DXF file into Scalable Vector Graphics (SVG) format and developing a marking algorithm of the generated SVG files.

Similarly, another traditional technique provides for a framework for engineering drawings recognition using a case-based approach, wherein a user interactively provides an example of one type of graphic object in an engineering drawing and then system tries to learn the graphical knowledge of this type of graphic object from the example and later use this learned knowledge to recognize or search for similar graphic objects in engineering drawings. However, none of the traditional systems and methods provide for an automated end-to-end data extraction from the piping and instrumentation diagrams.

The method disclosed attempts to overcome the limitations faced by the traditional systems and techniques. For example, the method disclosed provides for a robust detection of each component from piping and instrumentation diagrams sheets via Deep Learning techniques, and associating each of the detected component, thereby facilitating end-to-end data extraction and automation of information extraction from the piping and instrumentation diagrams.

Referring now to the drawings, and more particularly to FIG. 1 through 14, where similar reference characters denote corresponding features consistently throughout the figures, there are shown preferred embodiments and these embodiments are described in the context of the following exemplary system and/or method.

FIG. 1 illustrates an exemplary block diagram of a system 100 for automating information extraction from piping and instrumentation diagrams, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory 102. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 can be configured to store any data that is associated with automating information extraction from piping and instrumentation diagrams. In an embodiment, the information pertaining to detection of components from piping and instrumentation diagrams, association, generation of trees etc. is stored in the memory 102. Further, all information (inputs, outputs and so on) pertaining to the automation of information extraction from the piping and instrumentation diagrams, may also be stored in the database, as history data, for reference purpose.

According to an embodiment of the present disclosure, the architecture and flow of the system 100 for automating the information extraction from the piping and instrumentation diagrams may be considered in detail. By referring to FIG. 2, it may be noted that the architecture comprises a Piping and Instrumentation Diagrams sheet 201, a Detection and Recognition Engine 202 and an Association Module 203. The piping and instrumentation diagrams sheet 201 comprises engineering schematics or piping and instrumentation diagrams from which data or information is to be extracted by implementing the proposed methodology.

Initially, the piping and instrumentation diagram sheet 201 is fed to the detection and recognition engine 202, and the detection and recognition engine 202 identifies and isolates different components of the process flow like pipelines, pipeline codes, inlets, outlets and symbols using a combination of image processing and deep learning models. Subsequently, the extracted components are sent to the association module 203 for mapping with an appropriate pipeline. Finally, a tree-like data structure is created to determine the flow from inlet to outlet.

Figure 2:
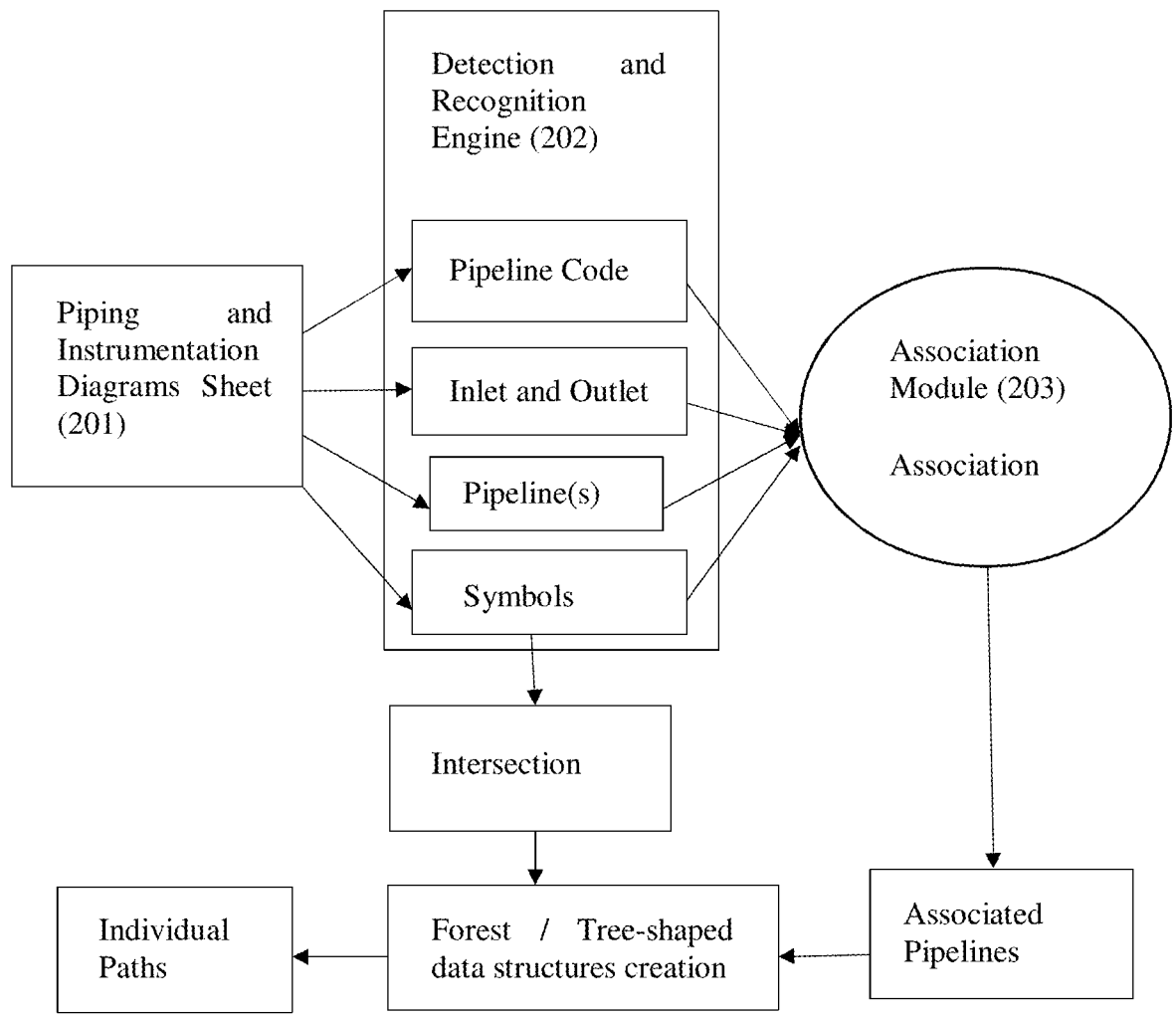
FIG. 2 is an architectural diagram depicting components and flow of the system for automating the information extraction from the piping and instrumentation diagrams, in accordance with some embodiments of the present disclosure.
Figure 3:
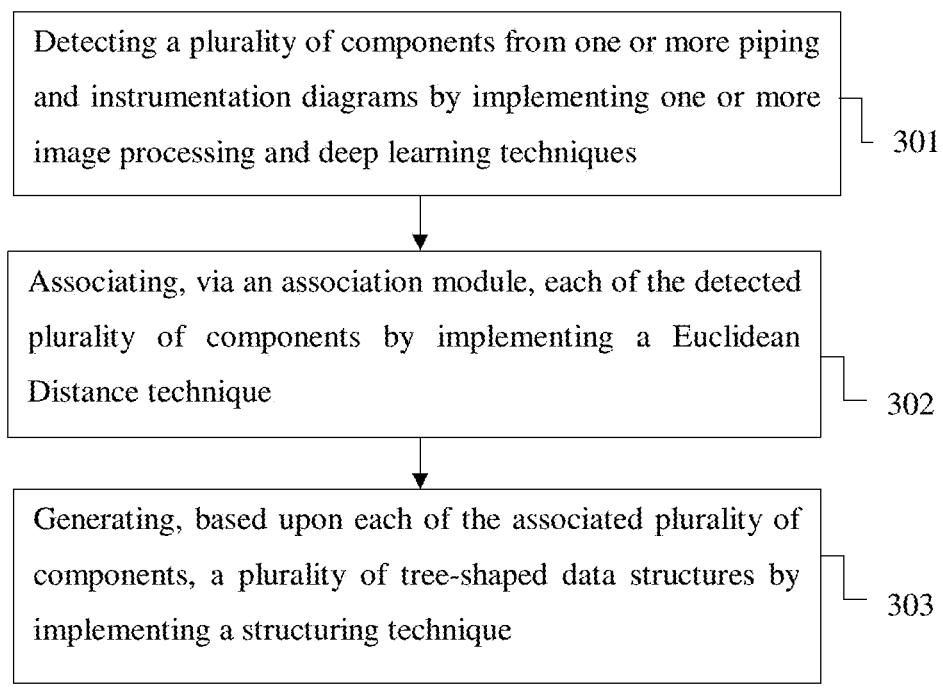
FIG. 3 is a flow diagram illustrating the steps involved in the process of automating the information extraction from the piping and instrumentation diagrams, in accordance with some embodiments of the present disclosure.
Figure 4A:
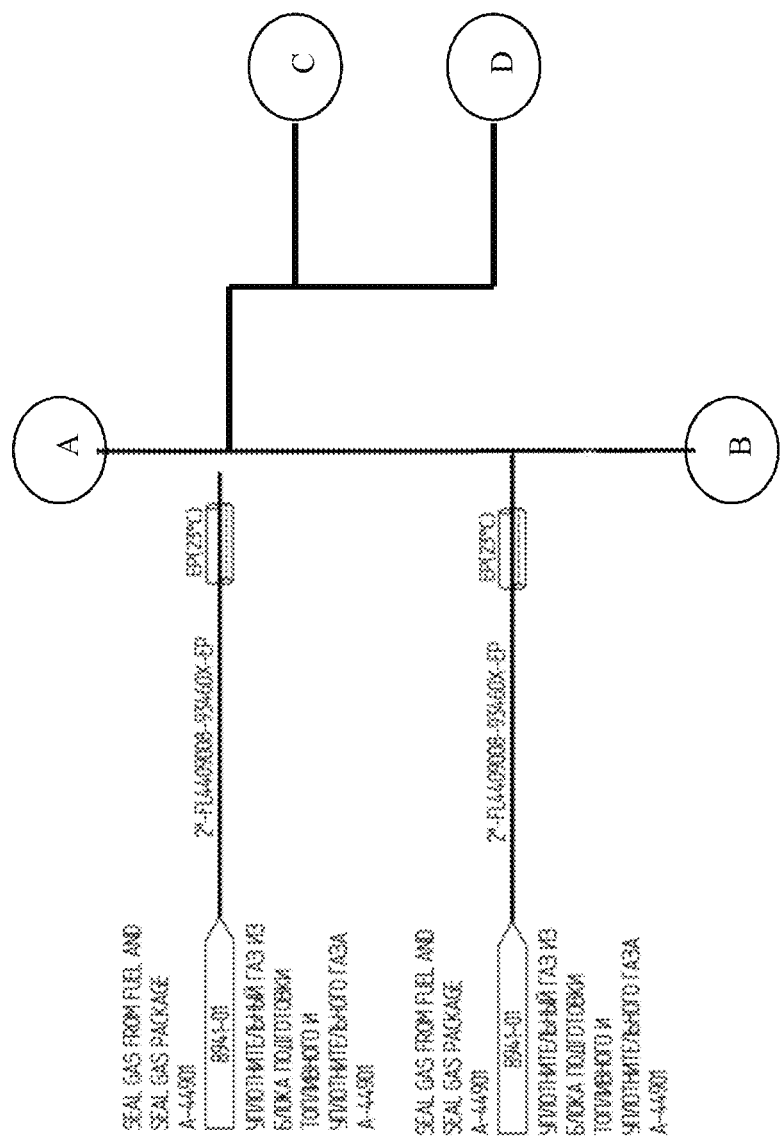
FIG. 4A to 4E illustrates an example of a piping and instrumentation diagrams sheet, in accordance with some embodiments of the present disclosure.
Figure 4B:
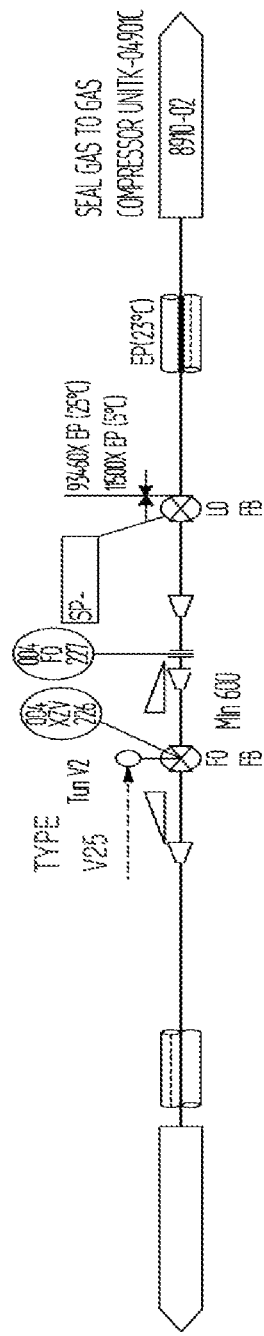
Figure 4C:
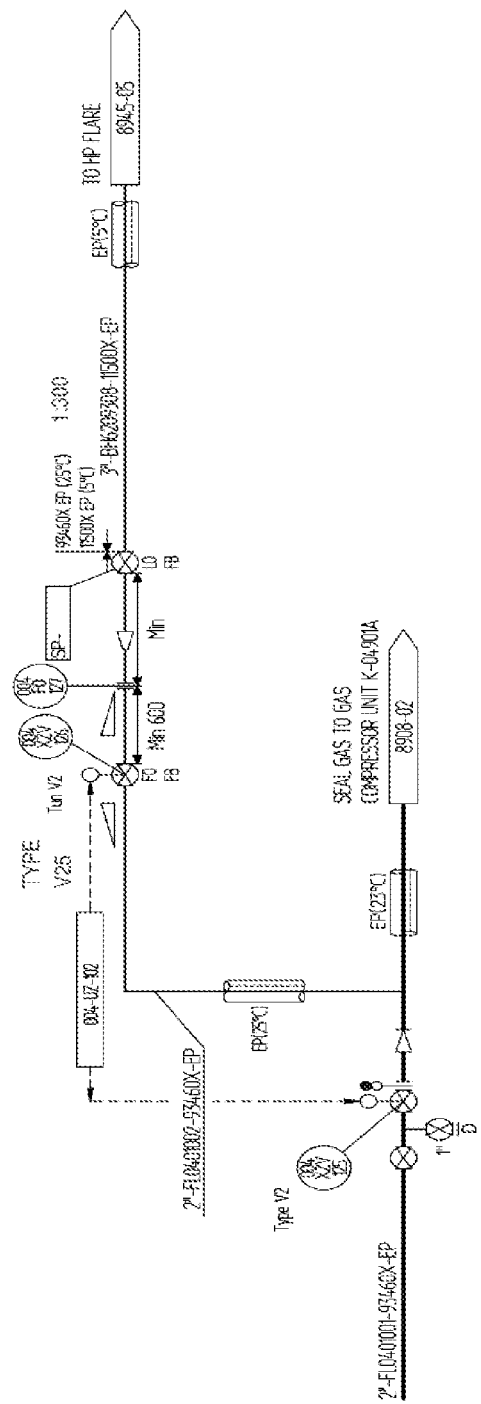
Figure 4D:
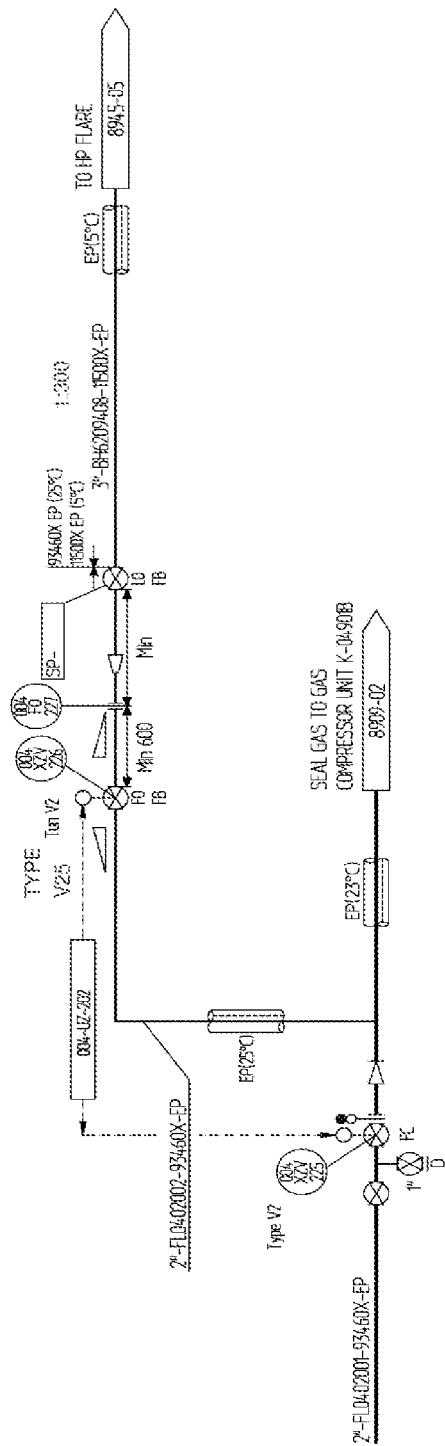
Figure 4E:
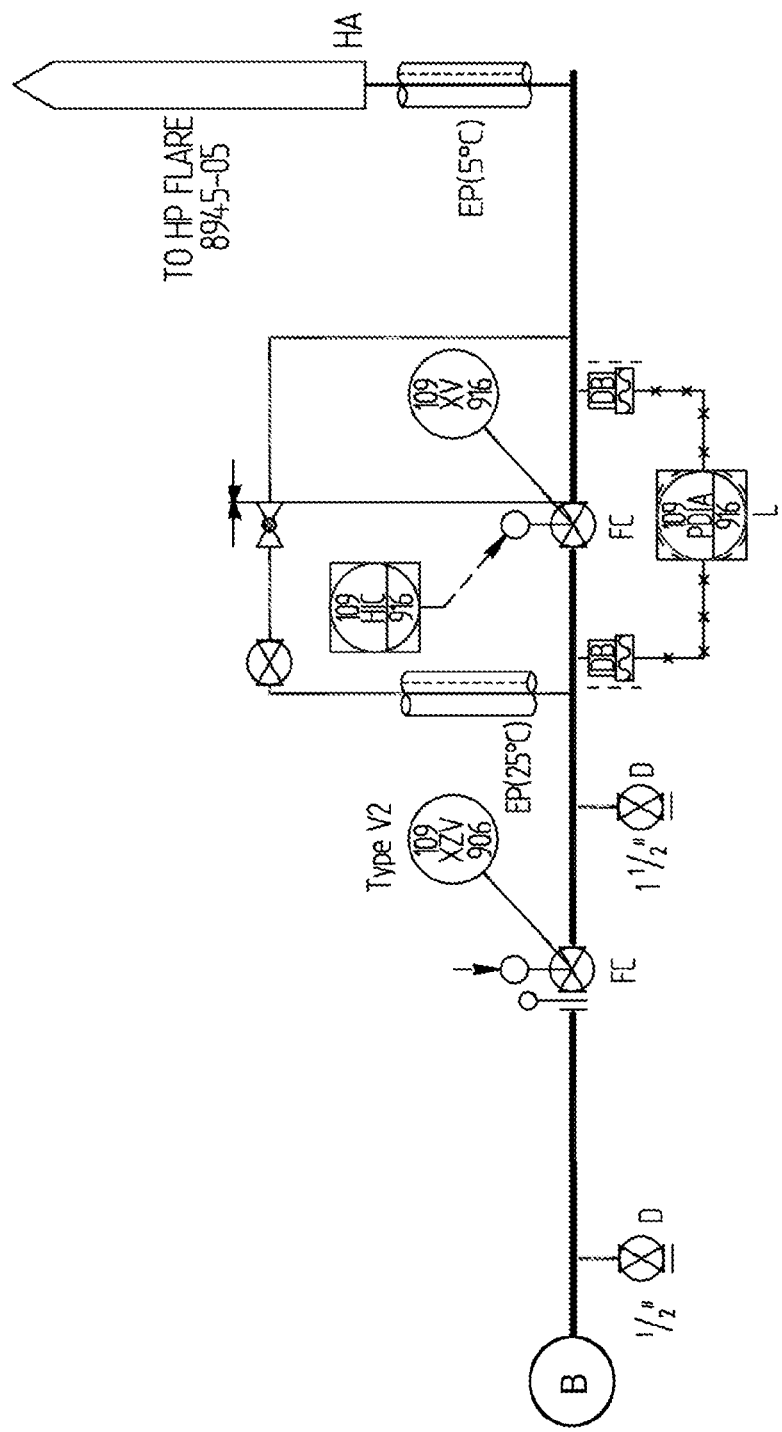

FIG. 3, with reference to FIGS. 1 and 2, illustrates an exemplary flow diagram of a method for automating the information extraction the from piping and instrumentation diagrams, in accordance with some embodiments of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

According to an embodiment of the present disclosure, at step 301, the one or more hardware processors 104 are configured to detect a plurality of components from one or more piping and instrumentation diagrams by implementing one or more image processing and deep learning techniques. By referring to FIG. 4A to 4E, a sample (or an example) of piping and instrumentation diagrams sheet comprising text segments and non-text segments may be referred. By referring to FIG. 4A to 4E again, it may be noted that the piping and instrumentation diagrams sheet in general consist of a text, wherein the text represents a pipeline code, one or more side notes and the like. The text segments generally thus comprise of a plurality of pipeline codes.

Non-text segments in the one or more piping and instrumentation diagrams generally comprise a plurality of pipelines, a plurality of symbols, a plurality of inlets and outlets and the like. The non-text segments are thus generally graphic objects. Each of the text segments and non-text segments component in the one or more piping and instrumentation diagrams may be collectively referred to as the plurality of components. The process detecting each of the plurality of components from one or more piping and instrumentation diagrams may now be considered in detail.

Detection of the pipeline code—In an embodiment, the pipeline code is detected initially from the plurality of components, as the pipeline code distinctly characterizes each pipeline. The method disclosed implements a Connectionist Text Proposal Network (CTPN) technique for the pipeline code detection. In comparison to the traditional systems and methods, wherein a thresholding followed by connected components is generally implemented to extract pipeline code(s), the CTPN technique utilizes a pre-trained CTPN Network on a scene-test dataset for detecting the pipeline code from the one or more piping and instrumentation diagrams. The CTPN is more robust to noise and color in the one or more piping and instrumentation diagrams.

In an embodiment, the CTPN technique implements a convolutional network which initially accepts arbitrarily sized images and detects a text line in an image by densely sliding window in the convolutional feature maps and produces a sequence of text proposals. This sequence is then passed through a recurrent neural network which allows the detector to explore meaningful context information of text line and hence, makes it powerful to detect extremely challenging text reliably. The CTPN technique thus generates a set of potential pipeline codes components with 100 percent recall, but further comprising a plurality of false positive pipeline codes.

Upon generating the set of potential pipeline codes components a Tesseract™ technique may be implemented for reading each pipeline code component detected in the previous step. Since, pipeline codes have fixed length and structure, a filtering may be performed on each of pipeline codes in the piping and instrumentation diagrams to remove or filter each of the plurality of false positive pipeline codes using regular expressions.

Considering an example scenario, the pipeline code is of the format N"-AANNNNNNN-NNNNNA-AA where N denotes a Digit and A denotes an alphabet. The CTPN technique thus finally generates the pipeline codes present in sheets comprising the one or more piping and instrumentation diagrams, thereby providing for a robust detection of the pipeline codes compared to the traditional systems and methods.

Detection of the inlet and outlet—As is known in the art, the inlet or outlet marks the starting or ending point of the pipeline. Generally, there is a standard symbol representing the inlet or outlet comprising a shape property, that is, a polygon having five vertices and the width of the bounding box is at least thrice its height. As compared to the traditional systems and methods the method disclosed uses the shape property to detect the inlet and outlet robustly via heuristics.

In an embodiment, for detecting the inlet and outlet, the one or more hardware processors 104 initially subtract the text blobs detected as pipeline codes from a binarized input image for further processing. The one or more hardware processors 104 implement a Ramer-Douglas algorithm in combination with a known relative edge lengths to identify one or more polygon. As is known in the art, the Ramer-Douglas algorithm (also referred to as 'the Ramer-Douglas-Peucker algorithm') is an algorithm for reducing the number of points in a curve that is approximated by a series of points.

Upon identification of the one or more polygons, the one or more polygons are identified either as an inlet or an outlet. By referring to FIG. 4A to 4E yet again, it may be noted that there are four possible cases of polygons as there are two types of tags present in the one or more piping and instrumentation diagrams, that is, a left-pointing and a right-pointing. Each of the right-pointing or left-pointing tag may either be an inlet or an outlet.

Figure 5:
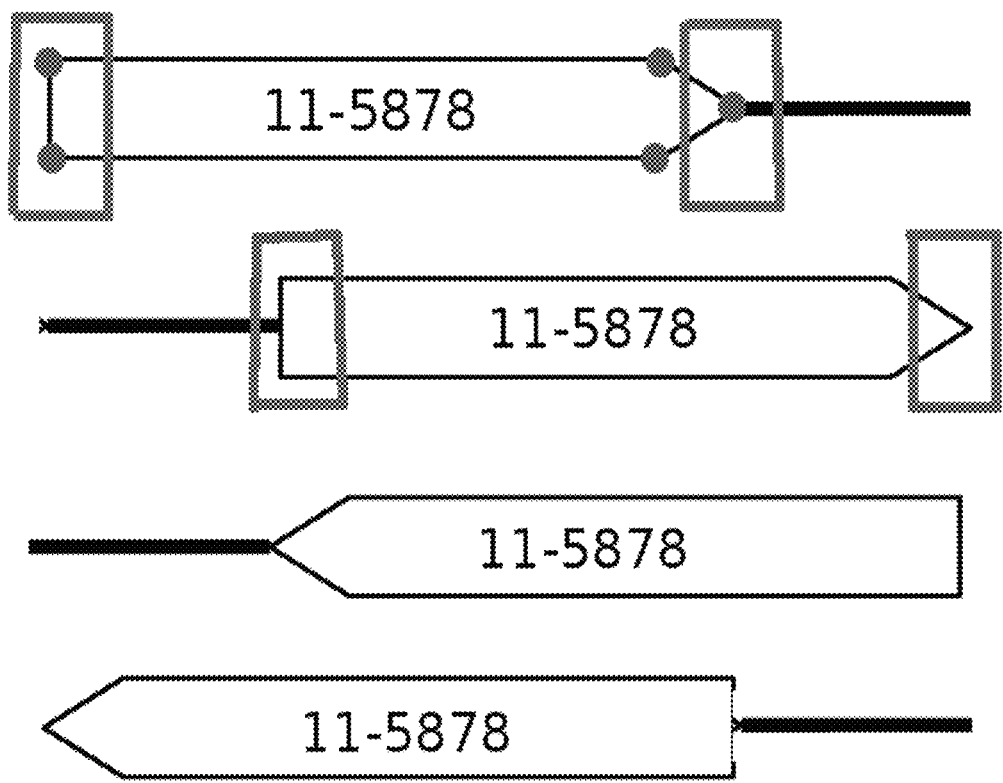
FIG. 5 illustrates an example of inlets or outlets from the piping and instrumentation diagrams sheet, in accordance with some embodiments of the present disclosure.

The one or more hardware processors 104 may then identify the orientation of tags from the points given by Ramer-Douglas knowing the fact that there will be three points on one side and two on another side in a right-pointing or left-pointing tag, as shown in FIG. 5. To further classify whether the candidate is an inlet or outlet, the one or more hardware processors 104 obtain a small kernel K on either side of the component image and find out which edge is crossed by a single line.

Detection of the pipeline—In an embodiment, initially, the detected text and the inlet and outlet tags may be removed from the image for detecting the pipelines. The pipeline from each image in the one or more pipping and instrumentation diagrams may then be detected by implementing a Probabilistic Hough Transform technique on the skeleton version of each of the image, thereby generating a set of all lines, including lines that do not correspond to pipelines in the one or more pipping and instrumentation diagrams. As is known in the art, the Hough Transform is a popular technique to detect any shape, if the shape can be represented in a mathematical form. It can detect the shape even if it is broken or distorted a little bit. The Probabilistic Hough Transform technique is an optimization to the traditional Hough Transform technique, as the Probabilistic Hough Transform technique does not consider all the points, and instead considers only a random subset of points and that is sufficient for line detection.

Figure 6:
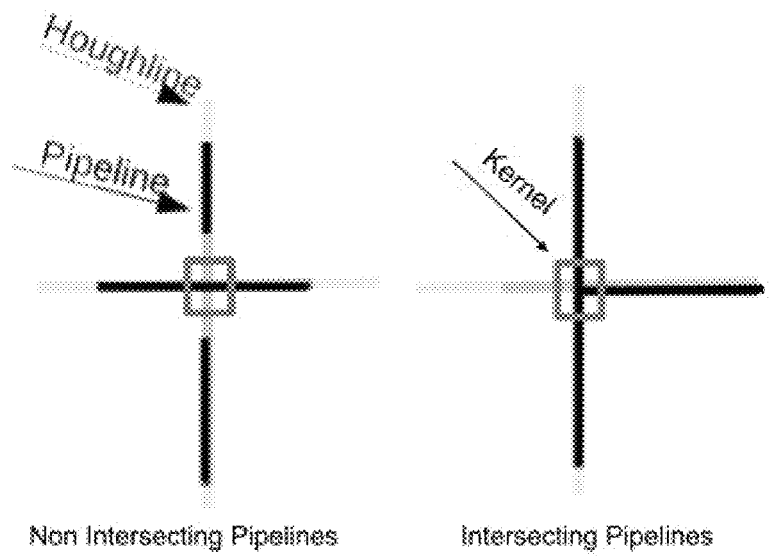
FIG. 6 illustrates an example of pipelines in the piping and instrumentation diagrams sheet, in accordance with some embodiments of the present disclosure.

Detection of Pipeline Intersections—By referring to FIG. 6, it may be noted that the output from the implementation of the Probabilistic Hough Transform technique (while detecting the pipeline) results in the set of lines that do not consider gap(s) at intersections. The intersections may be valid intersections or invalid intersections. The method disclosed identifies each of the valid intersections by determining each of intersection between any two line segments by solving the system of linear equations. The solution to the equations is a point which should lie on both finite pipelines. The assumption ensures that the solution is a part of foreground.

By referring to FIG. 6 again, a gap in one of the lines involved in the intersection indicates that as an invalid intersection. The invalid intersection is an intersection where the solution of the two linear equations for the line has given us an intersection but there exists no such intersection in the image. To discard invalid intersections, the one or more hardware processors 104 draw a square kernel of size 21 with the center at the intersection and check for lines intersecting with the edges of the square.

For detecting the pipeline intersections, there may be two possibilities. The first possibility may be where the intersections are on the opposite edges of the square and there are no intersections on other two edges of the square. The second possibility may be a possibility of an intersection of three and/or on all four edges of the square. The second possibility is the case of the valid intersection, thereby resulting in the detection of the pipeline intersections.

Detection of symbols—In general, the piping and instrumentation diagram sheets comprise of a plurality of symbols, wherein each of the plurality of symbols represent certain instruments responsible for controlling the flow of oil through pipelines and performing various tasks. The method disclosed facilitates detecting and automating the detection of ten classes of symbols, that is, a ball_valve, a check_valve, a chemical_seal, a circle_valve, a concentric, a flood_connection, a globe_valve, a gate_valve_nc, an insulation and a globe_valve_nc.

Figure 7:
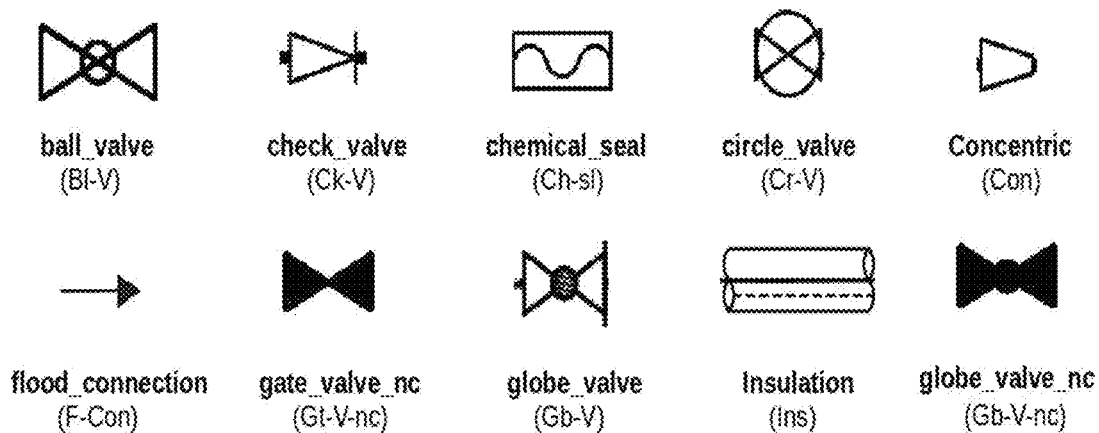
FIG. 7 illustrates an example of symbols in the piping and instrumentation diagrams sheet, in accordance with some embodiments of the present disclosure.
Figure 8:
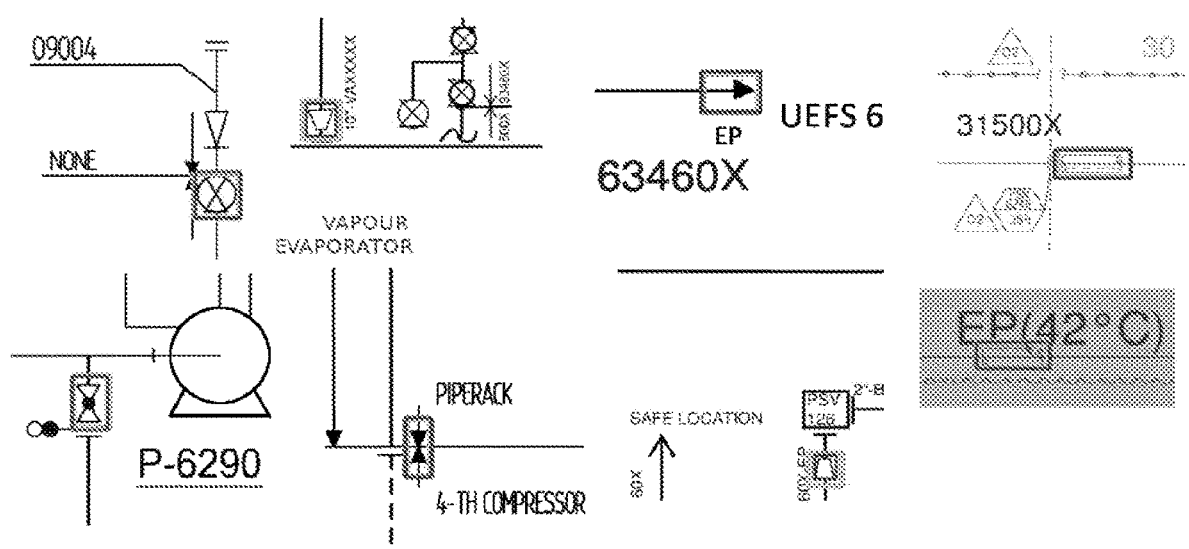
FIG. 8 illustrates an example of detected symbols by implementing the method disclosed, in accordance with some embodiments of the present disclosure.
Figure 9:
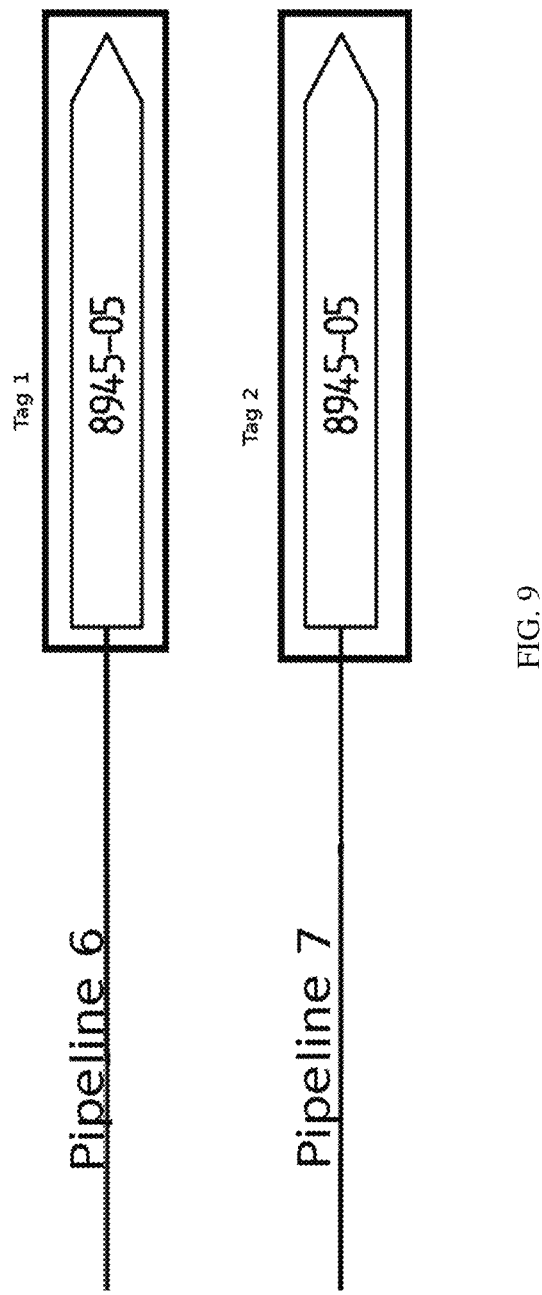
FIG. 9 illustrates an example of tags to pipeline association performed by implementing the method disclosed, in accordance with some embodiments of the present disclosure.
Figure 10:
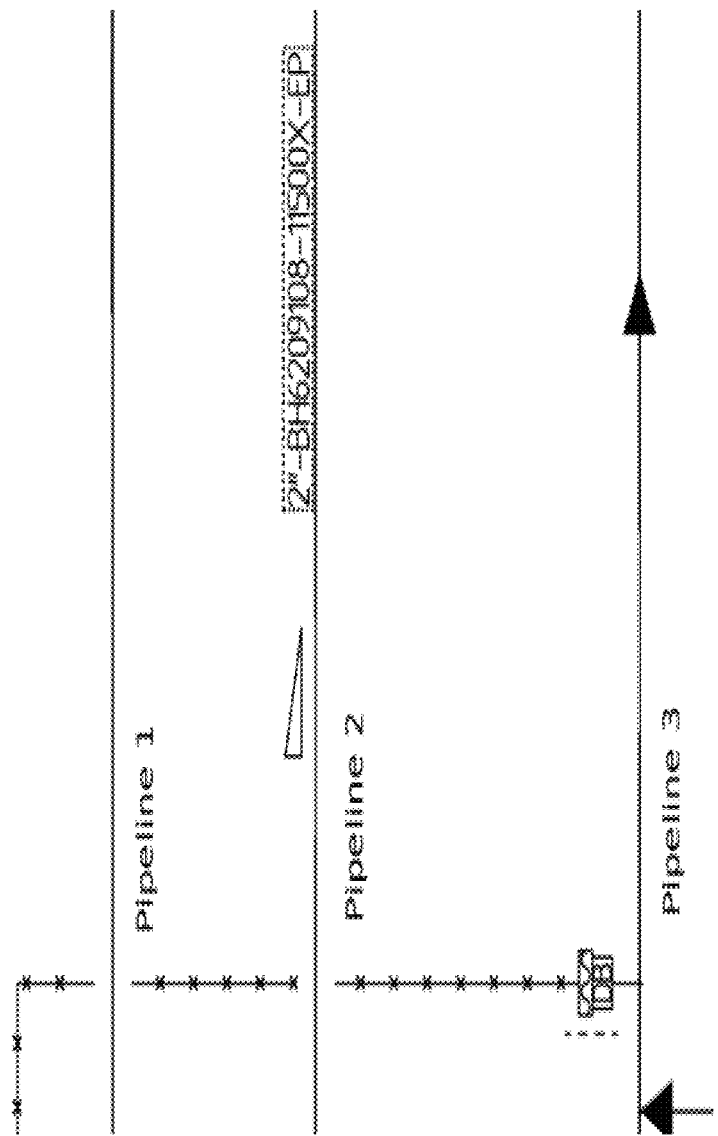
FIG. 10 illustrates an example of pipeline code to pipeline association performed by implementing the method disclosed, in accordance with some embodiments of the present disclosure.
Figure 11:
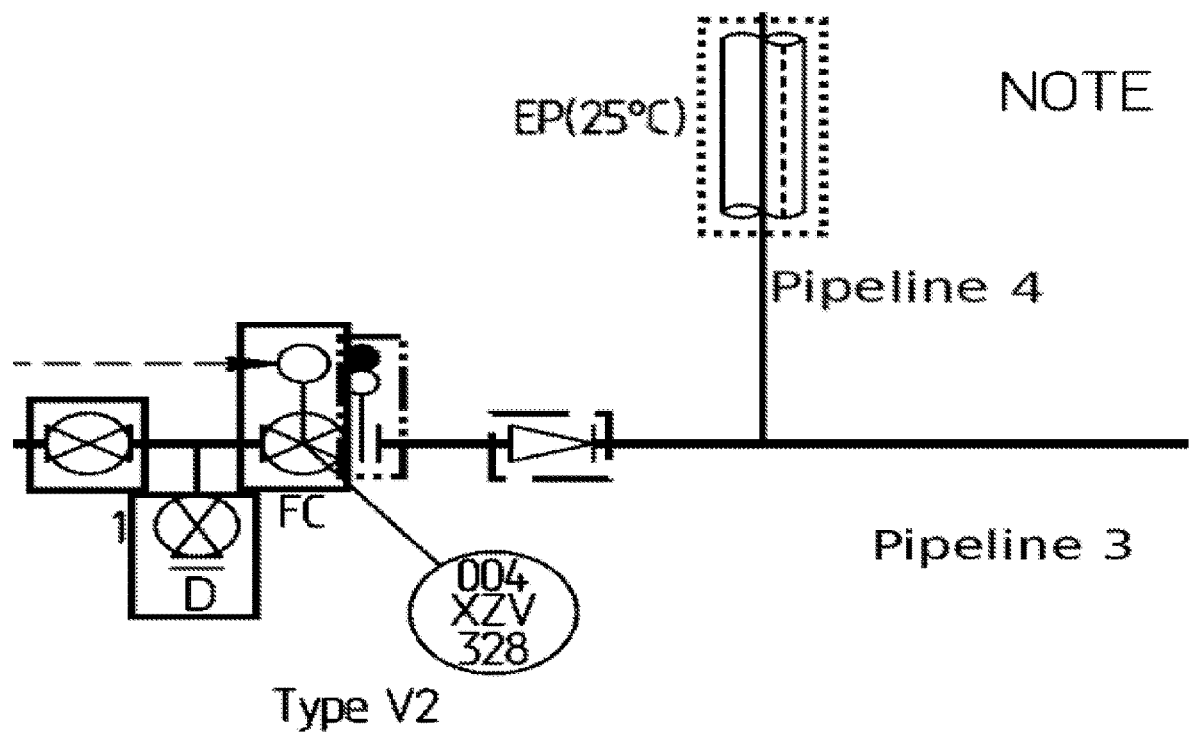
FIG. 11 illustrates an example of symbols to pipeline association performed by implementing the method disclosed, in accordance with some embodiments of the present disclosure.
Figure 12:
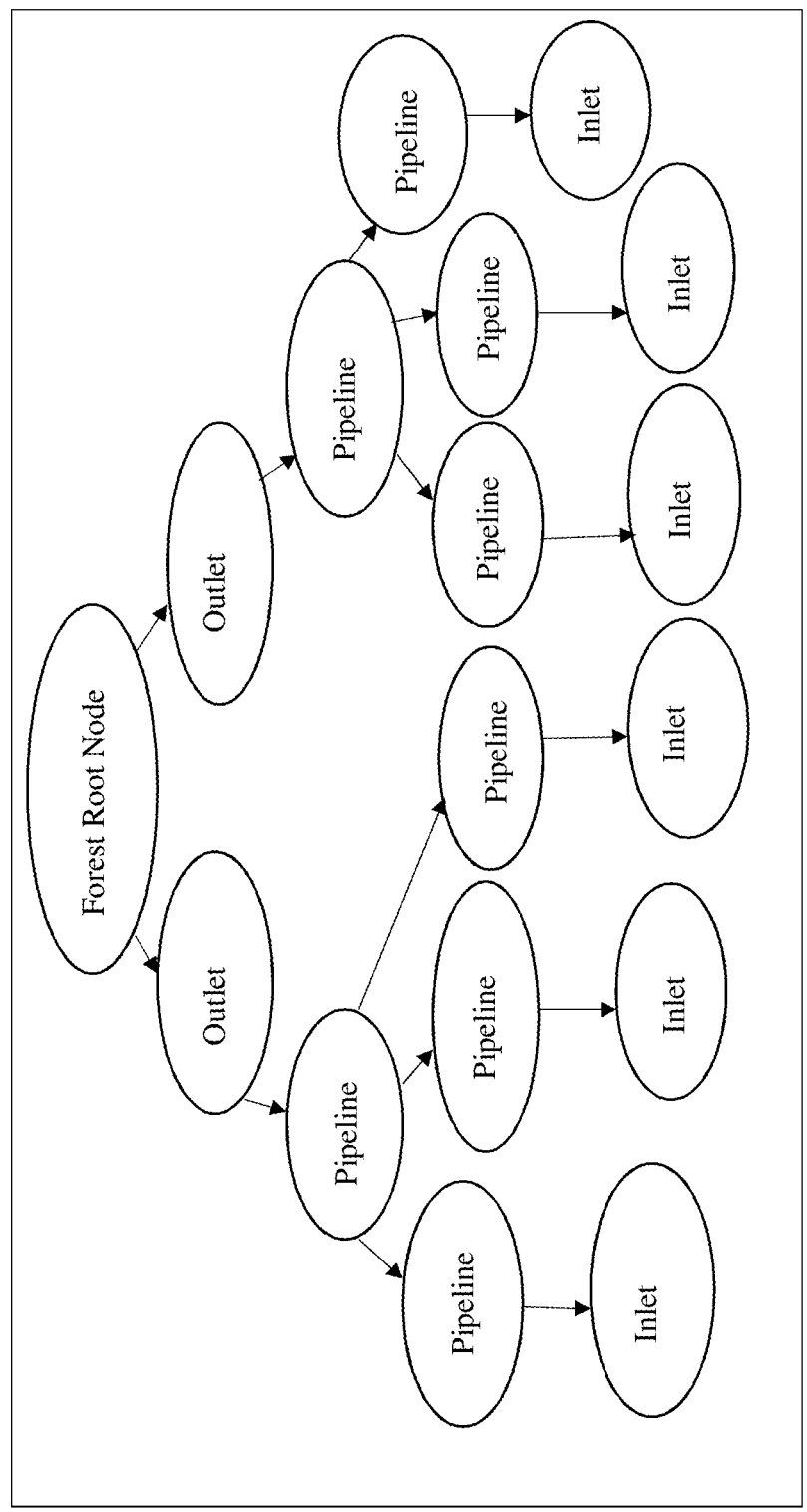
FIG. 12 illustrates an example of a tree-shaped data structure generated by associating of detected piping and instrumentation diagrams components, in accordance with some embodiments of the present disclosure.
Figure 13A:
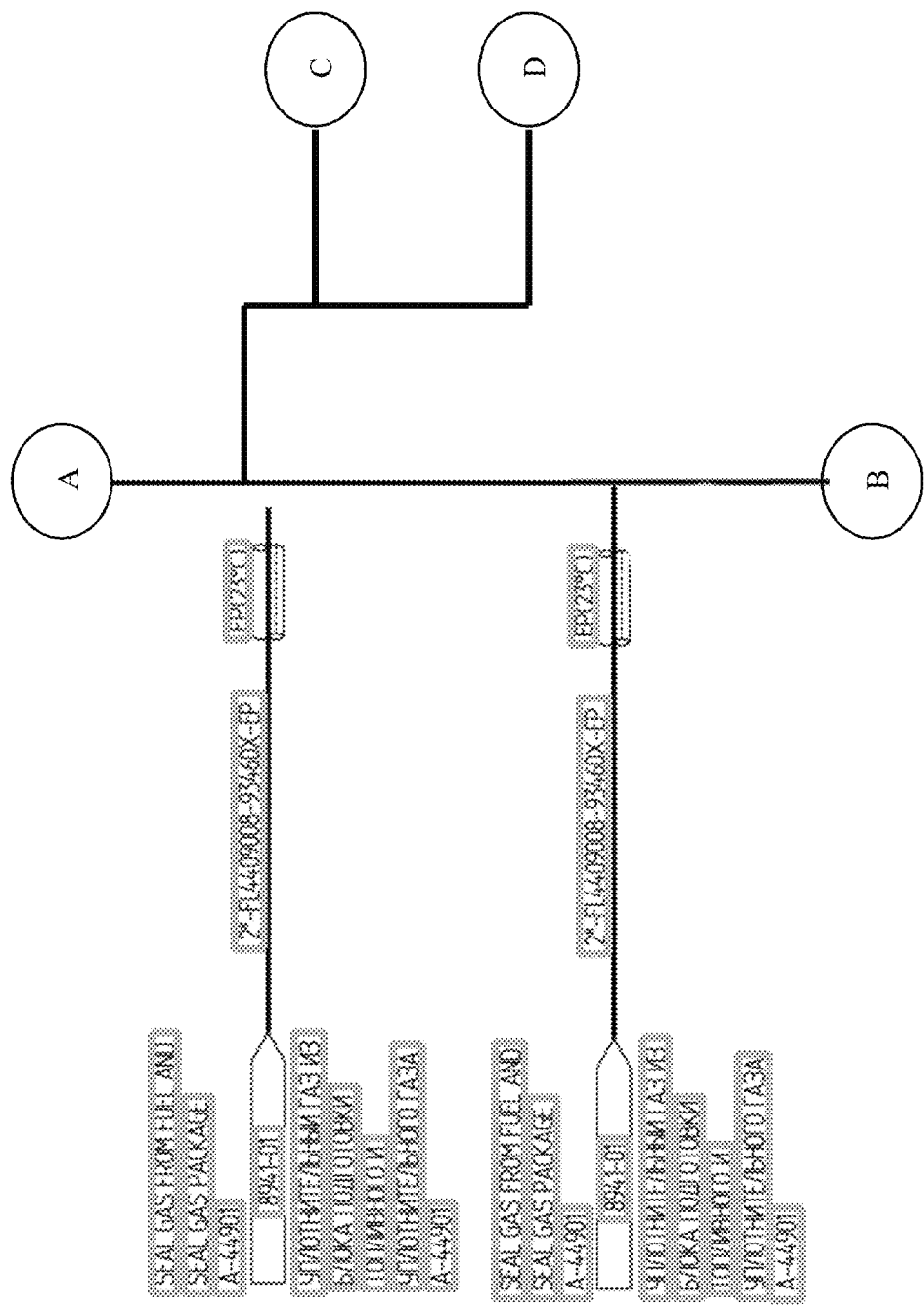
FIG. 13A to 13E illustrates an example of the visual output of a Connectionist Text Proposal Networks (CTPN) technique on text detection from the sample piping and instrumentation diagrams sheet, in accordance with some embodiments of the present disclosure.
Figure 13B:
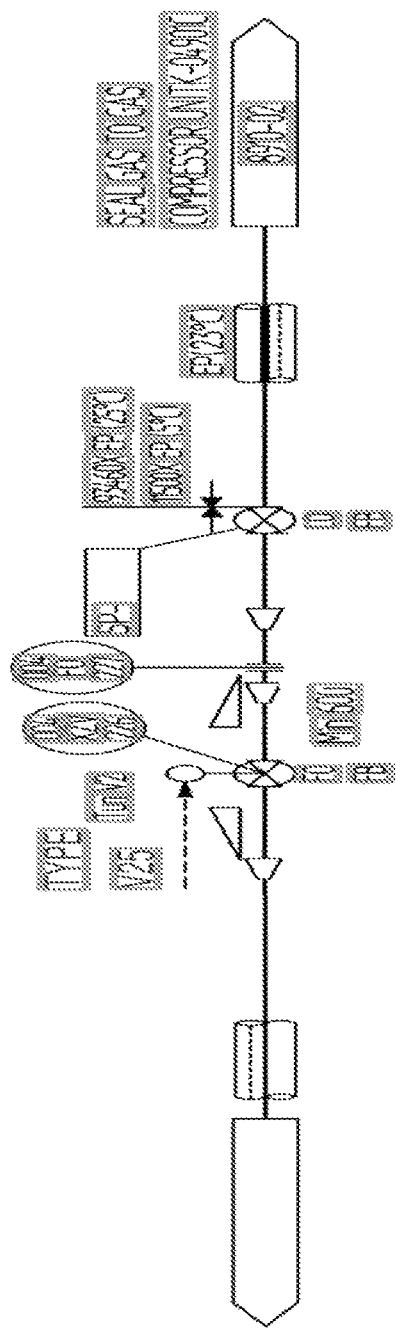
Figure 13C:
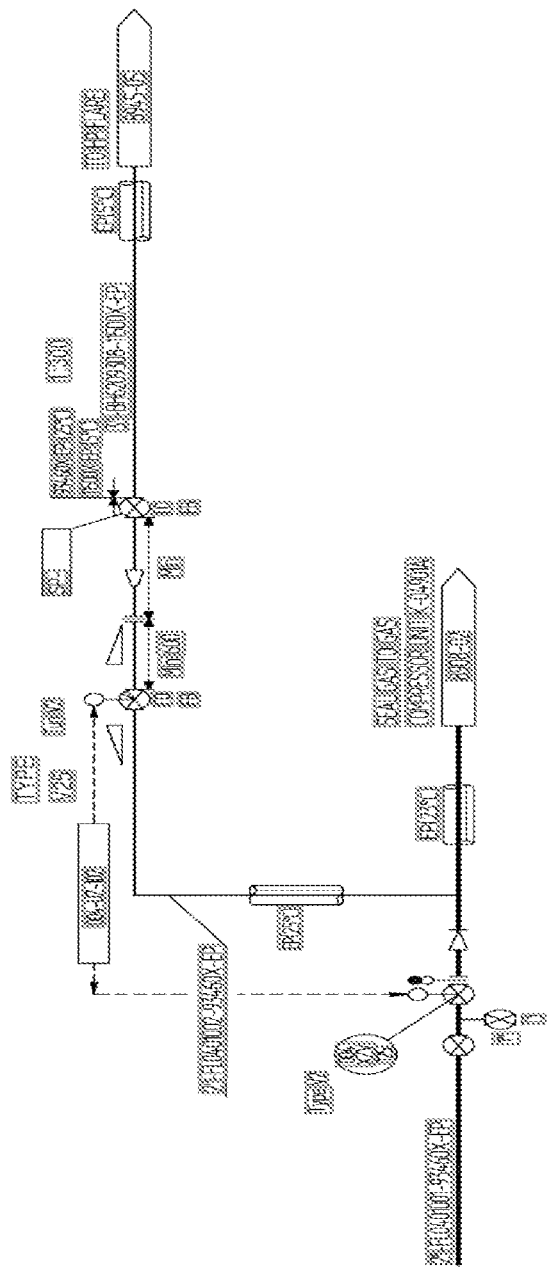
Figure 13D:
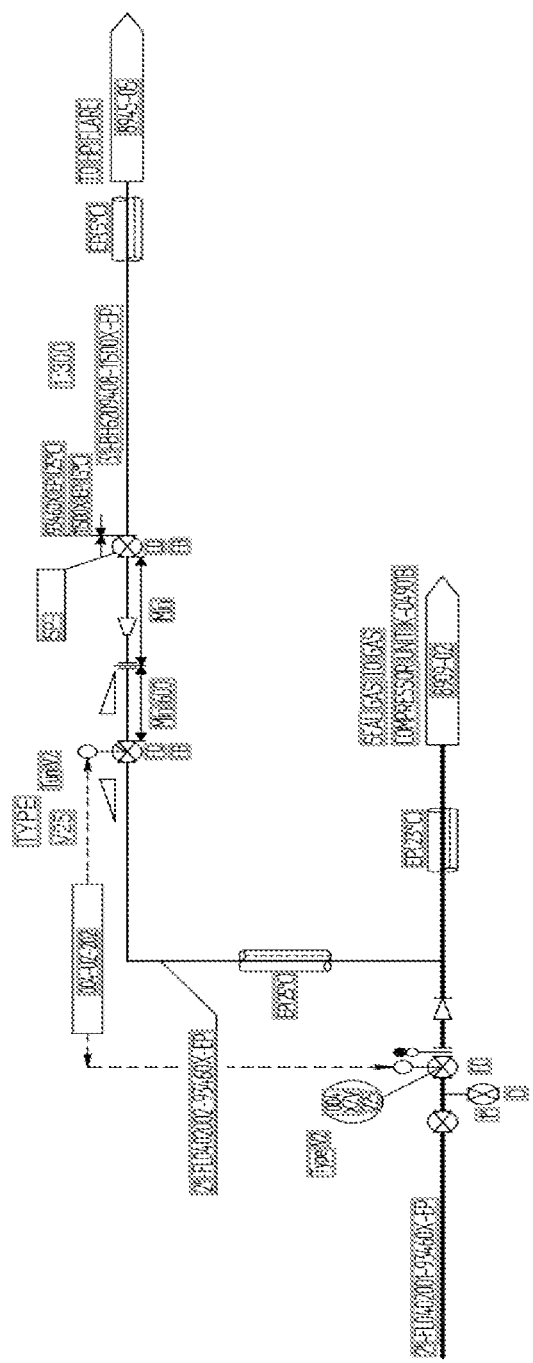
Figure 13E:
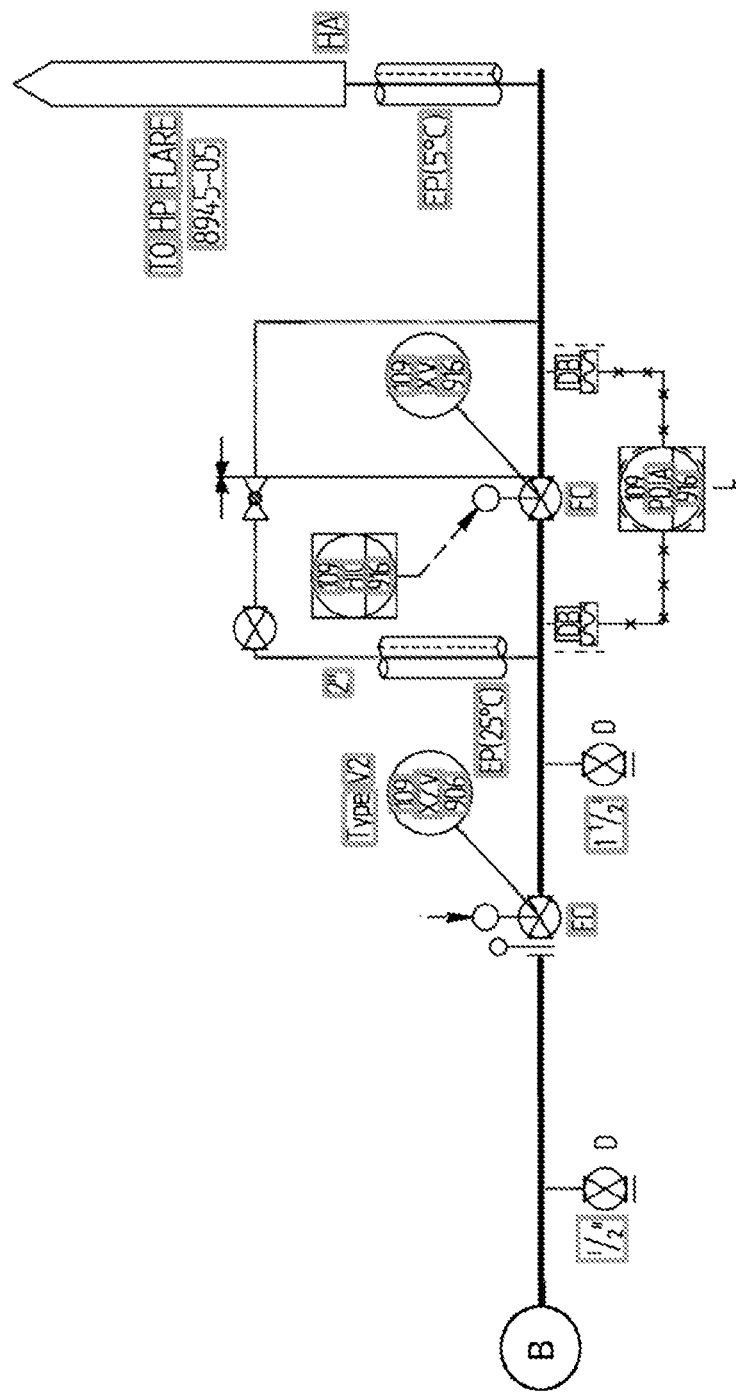
Figure 14:
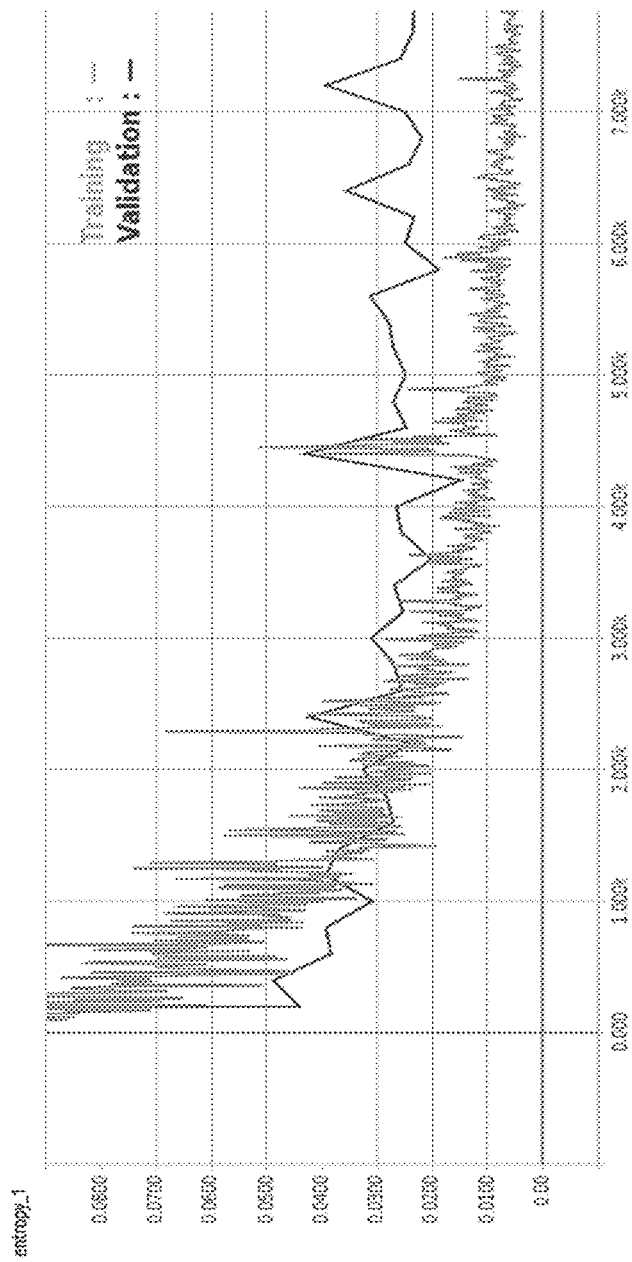
FIG. 14 illustrates graphically a plot displaying cross-entropy loss for train and validation sets during training of a Fully Convolution Network (FCN) for the detection of symbols, in accordance with some embodiments of the present disclosure.

By referring to FIG. 7, it may be noted that as the symbols have very low inter-class difference in visual appearances, the traditional deep learning technique for classification do not provide for a robust detection of such symbols. The method disclosed implements a Fully Convolutional Network (FCN) technique for detecting each of the plurality of symbols. The FCN(s) are convolutional networks where the last fully connected layer is replaced by a convolution layer with large receptive field.

Implementation of the FCN technique facilitates a robust detection of the plurality of symbols as a FCN comprises of two paths. The first path comprises a downsampling path which is composed of convolutions, max pooling operations and extracts a set of contextual information from the image, while the second path is an upsampling path which comprising of transposed convolutions, unpooling operations to produce the output with size similar to input image size and learns the precise spatial location of one or more objects in the image. By referring to FIG. 8, an example of the detected symbols, the extracted set of contextual information, and the learned spatial location of one or more objects may be referred.

In an embodiment, for detecting the symbol using the FCN technique, the method disclosed annotated a dataset of real-world piping and instrumentation diagrams from an oil firm. As the original piping and instrumentation diagrams sheets are generally of very large size, initially, the piping and instrumentation diagrams sheets may be divided into a plurality of small patches of size 400×400 each for annotating the symbols. Each of the plurality of small patches comprise different classes of symbols may further comprise of one or more symbols (amongst the plurality of symbols) present in a single patch.

In an embodiment, each of the plurality of symbols may be annotated by masking their pixel values completely (thereby generating a plurality of masks for each symbol) and subsequently, obtaining one or more outlies (or boundaries) of each of the plurality of masks via the FCN technique. From the one or more outlines, a shape of the symbol may then be represented for detecting the symbol. The method disclosed further facilitates automating the process of the obtaining the one or more outlies of symbol mask(s), by applying a filter on the region containing the mask shape, that is, a bitwise AND operation was used.

Further, the one or more hardware processors 104 perform a thresholding of each of the plurality of small patches to obtain boundaries/outlines, and then dilating with a filter of size 3×3. As the training dataset was limited, the method disclosed augmented the images by performing some transformation, for example, a transformation and/or a rotation, on each image. A VGG-19™ based FCN was used and implemented for training a symbol detector, wherein an input image of size 400×400 is fed to the network and it is trained using Adam optimizer with a learning rate of 0.0004 and batch size of 8.

According to an embodiment of the present disclosure, at step 302, the one or more hardware processors 104 are configured to associate, via the association module 203, each of the detected plurality of components by implementing a Euclidean Distance technique. The association of each of the detected plurality of components may be performed, inter-alia, to form a structure of pipeline schematics. The process of associating the plurality of components with an appropriate pipeline (also herein referred to as a closest pipeline) along with determination of the appropriate pipeline may now be considered in detail.

In an embodiment, the association may be performed by the one or more hardware processors 104 by communicating and passing each of the detected plurality of components to the association module 203. The association module 203 then performs a mapping of the plurality of components with the appropriate pipeline or the closest pipeline. The association is implemented as below:

(i) Tags to Pipeline Association—The one or more hardware processors 104 identify a line emerging from the orientation of the detected inlet and outlet, and then associate, via the association module 203, a closest pipeline from the line emerging point in the direction of pipeline to the tag. The closest pipeline may be determined by implementing the Euclidean distance technique. As is known the art, the Euclidean distance technique measures or examines the root of square differences between coordinates of a pair of objects. Considering an example scenario, by referring to FIG. 9, an example of the tags to pipeline association may be referred, wherein 'Tag 1' is associated to 'pipeline 6' and 'Tag 2' is associated to 'pipeline 7' based on the Euclidean distance technique.

(ii) Pipeline code to Pipeline Association—The one or more hardware processors 104 assign each of the detected pipeline codes to a nearest or closest pipeline based upon the Minimum Euclidean distance technique from any vertex of the bounding box of nearest to the nearest point on the line. Considering an example scenario, by referring to FIG. 10, an example of the pipeline code to pipeline association may be referred, the detected pipeline code '2"BH6209108-11500X-EP' is associated to 'pipeline 2' because of minimum distance between them.

(i) Symbols to Pipeline Association—Each detected symbol is associated to a closest pipeline using a Minimum Euclidean distance technique, provided it is not separated from the pipeline. Considering an example scenario, by referring to FIG. 11, an example of the symbols to pipeline association may be referred, wherein the detected symbol 'insulator' marked with dashed rectangle is associated to 'pipeline 4' based upon minimum distance between them, wherein the minimum distance is determined using the Minimum Euclidean distance technique.

According to an embodiment of the present disclosure, at step 303, the one or more hardware processors 104 are configured to generate, based upon each of the associated plurality of components, a plurality of tree-shaped data structures by implementing a structuring technique, wherein each of the plurality of tree-shaped data structures capture a process flow of pipeline schematics corresponding to the one or more piping and instrumentation diagrams. A forest, comprising of the plurality of tree-shaped data structures is thus generated by associating the each of the plurality of detected components with the appropriate pipeline(s). Considering an example scenario, by referring to FIG. 12, an example of a tree-shaped data structure generated from the associating of the detected plurality of components may be referred.

By referring to FIG. 12 again, it may be noted that each tree in the plurality of tree-shaped data structures comprises a root node, a leaf node and an intermediate node for capturing the process flow of pipeline schematics. Further, the detected outlet is treated as the root node, the detected inlet is treated as the leaf node, and the detected pipeline corresponds to the intermediate node. By referring to FIG. 12 yet again, it may be noted that each tree in the plurality of tree-shaped data structures represent a one-to-many relationship between the inlet and the outlet.

In an embodiment, each tree has minimum height of 2, root node has single child. Trees can have common nodes, that is, it can have common pipelines and inlet tags, but a root node is unique in the forest. At any time, a single flow path is represented by unique path between an inlet and an outlet. The process flow of the pipeline schematics may thus be captured from each of the generated tree-shaped data structures, as flow of oil may be captured from each of the plurality of tree-shaped data structures. Thus, by executing steps 301 through 303, the entire process of information extraction from the piping and instrumentation diagrams may be automated.

In an embodiment, the step of capturing the process flow of pipeline schematics is preceded by pruning, via a filtering technique, each of the plurality of tree-shaped data structures, for filtering a set of false positive pipelines from the from one or more piping and instrumentation diagrams. A false positive pipeline is the one which is represented in a tree as a leaf node and does not link to any of the inlets. The filtering technique comprises pruning or traversing each tree (amongst the plurality of tree-shaped data structures) starting from a root node and removing all nodes that do not lead to any inlet.

According to an embodiment of the present disclosure, the performance of the method disclosed may be evaluated and discussed in detail. For implementing the method disclosed, a dataset of real-world piping and instrumentation diagram sheets was used for quantitative evaluation, wherein the dataset comprises four sheets, further comprising of 672 flow diagrams. By referring to Table 1 below, the accuracy of the detection and the associating of the plurality of components may be referred. By referring to Row 1 of Table 1, the accuracy of the pipeline code detection by the CTPN technique, followed by the filtering of false positives using domain knowledge of a standard code format.

TABLE 1

| Component | Results of Individual Component | |
|---|---|---|
| | Successful Cases | Accuracy |
| Pipeline Code detection | 64/71 | 90.1% |
| Pipeline detection | 47/72 | 65.2% |

TABLE 1-continued

| Component | Results of Individual Component | |
|---|---|---|
| | Successful Cases | Accuracy |
| Outlet detection | 21/21 | 100% |
| Inlet detection | 32/32 | 100% |
| Pipeline Code association | 41/64 | 64% |
| Outlet association | 14/21 | 66.5% |
| Inlet association | 31/32 | 96.8% |

By referring to Table 1 again, it may be noted that 64 codes out of 71 codes are successfully detected by implementing the method disclosed, giving an accuracy of 90.1% in the detection process. Further, by referring to FIG. 13A to 13E, the visual output of the CTPN technique on text detection on a sample piping and instrumentation diagrams sheet may be referred. By referring to Table 1 yet again, it may be noted that the pipeline are detected with an accuracy of 65.2% because of the presence of some random noise such as line markings and overlaid diagrams along with the pipelines.

By referring to Rows 3 and 4 Table 1, it may be noted that by implementing the method disclosed for the detection of inlet and outlet resulted in an accuracy of 100%. During the associating of pipeline codes and outlets with the appropriate pipe, the method disclosed was able to successfully associate 41 out of 64 pipeline codes and 14 out of 21 outlets, only, as sometimes few pipelines are not detected properly or pipelines do not intersect with the outlet (as shown in Row 2 of Table 1). However, by implementing the method disclosed, the inlets may be associated quite successfully with the appropriate pipeline, thereby resulting in an association accuracy of 96.8%.

According to an embodiment of the present disclosure, by referring to Table 2 below (that is, a confusion matrix) results of the symbol detection, in the form of the confusion matrix, performed by implementing the method disclosed may be discussed in detail. The FCN is trained for approx. 7400 iterations and the network at 7000 iterations was saved by observing the cross-entropy loss of training and validation set to prevent the network from overfitting. As mentioned supra, ten different classes of symbols were detected using the FCN technique. However, one extra class of symbols, herein referred to as 'others' was also used for evaluating the performance of the method disclosed. By referring to FIG. 14, a plot displaying cross-entropy loss for train and validation sets during training of the FCN for the detection of symbols may be referred.

TABLE 2

| | Predictions | | | | | | | | | | |
|---|---|---|---|---|---|---|---|---|---|---|---|
| Actual | Bl-V | CK-V | Ch-sl | Cr-V | Con | F-Con | Gt-V-nc | Gb-V | Ins | Gb-V-nc | Others |
| Bl-V | 74 | 2 | 0 | 0 | 0 | 0 | 0 | 0 | 0 | 0 | 0 |
| CK-V | 0 | 64 | 0 | 0 | 0 | 0 | 0 | 0 | 0 | 0 | 0 |
| Ch-sl | 0 | 0 | 25 | 0 | 0 | 0 | 0 | 0 | 0 | 0 | 0 |
| Cr-V | 0 | 0 | 0 | 294 | 0 | 0 | 0 | 0 | 0 | 0 | 0 |
| Con | 0 | 0 | 0 | 0 | 38 | 0 | 0 | 0 | 0 | 0 | 0 |
| F-Con | 0 | 0 | 0 | 0 | 0 | 41 | 0 | 0 | 0 | 0 | 0 |
| Gt-V-nc | 0 | 0 | 0 | 0 | 0 | 0 | 36 | 0 | 0 | 0 | 0 |
| Gb-V | 5 | 0 | 0 | 0 | 0 | 0 | 0 | 64 | 0 | 0 | 0 |
| Ins | 0 | 0 | 0 | 0 | 0 | 0 | 0 | 0 | 261 | 0 | 0 |
| Gb-V-nc | 0 | 0 | 0 | 0 | 0 | 0 | 0 | 0 | 0 | 52 | 0 |
| Others | 0 | 0 | 0 | 0 | 0 | 0 | 0 | 0 | 0 | 0 | 149 |

By referring to Table 2 again, it may be noted that the method disclosed, by the implementing the FCN technique, results in a robust symbol detection as compared to the traditional systems and methods. By referring to FIG. 7 again, it may be noted that symbols (to be detected), symbols such as ball_value, globe_valve_nc, gate_valve_nc and the like have a very low inter-class variation in appearance. For example, 5 out of 79 ball valve are being recognized as globe_valve, 4 out of 68 globe_valve are detected as ball_valve, 3 out of 57 globe_valve_nc are recognized as gate_valve_nc. Symbols such as gate_valve_nc and concentric are detected successfully by implementing the method disclosed.

As mentioned supra, by referring to FIG. 8 yet again, the detected symbols by implementing the method disclosed may be referred. Finally, by computing precision, recall and F1-score for each class of symbols, as given in Table 3 below, it is observed that the method disclosed detects symbols, even with very low visual difference in appearances, with impressive F1-scores of values more than 0.86 for every class. Precision is 100% for symbols like chemical seal, circle valve, concentric, insulation and globe_valve_nc.

TABLE 3

|         | Precision | Recall | F1-score |
|---------|-----------|--------|----------|
| Bl-V    | 0.925     | 0.936  | 0.931    |
| Ck-V    | 0.941     | 0.969  | 0.955    |
| Ch-sl   | 1         | 0.893  | 0.944    |
| Cr-V    | 1         | 0.989  | 0.995    |
| Con     | 1         | 0.905  | 0.95     |
| F-Con   | 0.976     | 0.837  | 0.901    |
| Gt-V-nc | 0.766     | 1      | 0.867    |
| Gb-V    | 0.888     | 0.941  | 0.914    |
| Ins     | 1         | 0.985  | 0.992    |
| Gb-V-nc | 1         | 0.929  | 0.963    |
| Others  | 0.955     | 1      | 0.977    |

According to an embodiment of the present disclosure, some of the technical advantages of the method disclosed may be considered in detail. The method disclosed facilitates an automated and end-to-end data extraction from the piping and instrumentation diagrams. None of the traditional systems and methods cite a complete automated and end-to-end data extraction from the piping and instrumentation diagrams. The method disclosed thus provides for an automatic generation of answers to important queries related to the connectivity of plant components, types of interconnections between process equipment(s) and the existence of redundant paths. Finally, as discussed supra, the accuracy achieved by implementation of the method disclosed for detecting the plurality of components is much higher to the traditional systems and methods.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of automating the information extraction from the piping and instrumentation diagrams. The embodiment, thus provides for detecting the plurality of components from the one or more piping and instrumentation diagrams by implementing the one or more image processing and deep learning techniques, associating each of the detected plurality of components, and generating, based upon each of the associated plurality of components, the plurality of tree-shaped data structures by implementing the structuring technique. Moreover, the embodiments herein further provides for the end-to-end data extraction from the piping and instrumentation diagrams.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for automating information extraction from one or more piping and instrumentation diagrams, the method comprising:
    detecting, via one or more hardware processors, a plurality of components from the one or more piping and instrumentation diagrams by implementing one or more image processing and deep learning techniques, wherein the plurality of components comprise at least one of a pipeline, a pipeline code, an inlet and an outlet, a symbol and a text, and detecting the inlet and the outlet by using shape property of the inlet and the outlet through heuristics, and wherein the pipeline code is detected using a Connectionist Text Proposal Network (CTPN) technique by:
        accepting arbitrarily sized images and detecting a text line in an image by densely sliding window in convolutional feature maps and producing a sequence of text proposals by implementing a convolutional network;
        passing the sequence of text proposals through a recurrent neural network to allow the detector to explore context information of the text line;
        filtering each of the pipeline codes detected to remove plurality of false positive pipeline codes using regular expressions;
    and detecting the symbol by implementing a Fully Convolutional Neural Network (FCN) technique, a set of contextual information from the symbol and learning a spatial location of one or more objects in the symbol;
    associating, via an association module, each of the detected plurality of components by implementing a Euclidean Distance technique, wherein the associating comprises mapping each of the detected plurality of components with at least one of an appropriate pipeline; and
    generating, based upon each of the associated plurality of components, a plurality of tree-shaped data structures with a plurality of trees by implementing a structuring technique, wherein each of the plurality of tree-shaped data structures capture a process flow of pipeline schematics corresponding to the one or more piping and instrumentation diagrams and wherein each tree in the plurality of tree-shaped data structures comprises a root node, a leaf node and an intermediate node for capturing the process flow of pipeline schematics, and wherein the detected outlet is treated as the root node, the detected inlet is treated as the leaf node, and the detected pipeline corresponds to the intermediate node.

2. The processor implemented method of claim 1, wherein the FCN technique comprises two paths:
    a downsampling path composed of convolutions, max pooling operations and extracting the set of contextual information from the image; and
    an upsampling path composed of transposed convolutions, unpooling operations to produce an output with size similar to input image size and learning the spatial location of one or more objects in the image.

3. The processor implemented method of claim 1, wherein the appropriate pipeline is determined from the one or more piping and instrumentation diagrams via the Euclidean Distance technique.

4. The processor implemented method of claim 1, wherein each tree in the plurality of tree-shaped data structures represent a one-to-many relationship between the inlet and the outlet.

5. The processor implemented method of claim 1, wherein the step of capturing the process flow of pipeline schematics is preceded by pruning, via a filtering technique, each of the plurality of tree-shaped data structures, for filtering a set of false positive pipelines from the one or more piping and instrumentation diagrams.

6. The processor implemented method of claim 5, wherein the step of filtering the set of false positive pipelines comprises removing, via the filtering technique, one or more pipelines from the one or more piping and instrumentation diagrams, and wherein the one or more pipelines are represented in each of the plurality of tree-shaped data structure as a leaf node.

7. The processor implemented method of claim 5, wherein the filtering technique comprises traversing each of the plurality of tree-shaped data structures starting from a root node and removing all nodes that do not lead to any inlet.

8. A system for automating information extraction from one or more piping and instrumentation diagrams, the system comprising:
    a memory storing instructions;
    one or more communication interfaces; and
    one or more hardware processors coupled to the memory via the one or more communication interfaces, wherein the one or more hardware processors are configured by the instructions to:
    detect a plurality of components from the one or more piping and instrumentation diagrams by implementing one or more image processing and deep learning techniques, wherein the plurality of components comprise at least one of a pipeline, a pipeline code, an inlet and an outlet, a symbol and a text and detect the inlet and the outlet by using shape property of the inlet and the outlet through heuristics, and wherein the pipeline code is detected using a Connectionist Text Proposal Network (CTPN) technique by:
        accepting arbitrarily sized images and detecting a text line in an image by densely sliding window in convolutional feature maps and producing a sequence of text proposals by implementing a convolutional network;
        passing the sequence of text proposals through a recurrent neural network to allow the detector to explore context information of the text line; and
        filtering each of the pipeline codes detected to remove plurality of false positive pipeline codes using regular expressions,
    and detecting the symbol by implementing a Fully Convolutional Neural Network (FCN) technique, a set of contextual information from the symbol and learning a spatial location of one or more objects in the symbol;

associate, via an association module, each of the detected plurality of components by implementing a Euclidean Distance technique, wherein the associating comprises mapping each of the detected plurality of components with at least one of an appropriate pipeline; and generate, based upon each of the associated plurality of components, a plurality of tree-shaped data structures with a plurality of trees by implementing a structuring technique, wherein each of the plurality of tree-shaped data structures capture a process flow of pipeline schematics corresponding to the one or more piping and instrumentation diagrams and wherein each tree in the plurality of tree-shaped data structures comprises a root node, a leaf node and an intermediate node for capturing the process flow of pipeline schematics, and wherein the detected outlet is treated as the root node, the detected inlet is treated as the leaf node, and the detected pipeline corresponds to the intermediate node.

9. The system of claim 8, wherein the the FCN technique comprises two paths:
a downsampling path composed of convolutions, max pooling operations and extracting the set of contextual information from the image; and
an upsampling path composed of transposed convolutions, unpooling operations to produce an output with size similar to input image size and learning the spatial location of one or more objects in the image.

10. The system of claim 8, wherein the one or more hardware processors are configured to determine the appropriate pipeline from the one or more piping and instrumentation diagrams via the Euclidean Distance technique.

11. The system of claim 8, wherein each tree in the plurality of tree-shaped data structures represent a one-to-many relationship between the inlet and the outlet.

12. The system of claim 8, wherein the one or more hardware processors are configured to capture the process flow of pipeline schematics by pruning, via a filtering technique, each of the plurality of tree-shaped data structures, for filtering a set of false positive pipelines from the one or more piping and instrumentation diagrams.

13. The system of claim 12, wherein the one or more hardware processors are configured to filter the set of false positive pipelines by removing, via the filtering technique, one or more pipelines from the one or more piping and instrumentation diagrams, and wherein the one or more pipelines are represented in each of the plurality of tree-shaped data structure as a leaf node.

14. The system of claim 13, wherein the filtering technique comprises traversing each of the plurality of tree-shaped data structures starting from a root node and removing all nodes that do not lead to any inlet.

15. One or more non-transitory machine readable information storage mediums comprising one or more instructions which when executed by one or more hardware processors causes:

detecting, via one or more hardware processors, a plurality of components from one or more piping and instrumentation diagrams by implementing one or more image processing and deep learning techniques, wherein the plurality of components comprise at least one of a pipeline, a pipeline code, an inlet and an outlet, a symbol and a text, and detecting the inlet and the outlet by using shape property of the inlet and the outlet through heuristics, and wherein the pipeline code is detected using a Connectionist Text Proposal Network (CTPN) technique by:

accepting arbitrarily sized images and detecting a text line in an image by densely sliding window in convolutional feature maps and producing a sequence of text proposals by implementing a convolutional network;

passing the sequence of text proposals through a recurrent neural network to allow the detector to explore context information of the text line; and filtering each of the pipeline codes detected to remove plurality of false positive pipeline codes using regular expressions, and detecting the symbol by implementing a Fully Convolutional Neural Network (FCN) technique, a set of contextual information from the symbol and learning a spatial location of one or more objects in the symbol;

associating, via an association module, each of the detected plurality of components by implementing a Euclidean Distance technique, wherein the associating comprises mapping each of the detected plurality of components with at least one of an appropriate pipeline, and generating, based upon each of the associated plurality of components, a plurality of tree-shaped data structures with a plurality of trees by implementing a structuring technique, wherein each of the plurality of tree-shaped data structures capture a process flow of pipeline schematics corresponding to the one or more piping and instrumentation diagrams and wherein each tree in the plurality of tree-shaped data structures comprises a root node, a leaf node and an intermediate node for capturing the process flow of pipeline schematics, and wherein the detected outlet is treated as the root node, the detected inlet is treated as the leaf node, and the detected pipeline corresponds to the intermediate node.

* * * * *